United States Patent
Ha et al.

(10) Patent No.: US 10,242,492 B2
(45) Date of Patent: Mar. 26, 2019

(54) 3D RENDERING AND SHADOW INFORMATION STORING METHOD AND APPARATUS

(71) Applicant: Samsung Electronics Co., Ltd., Suwon-si (KR)

(72) Inventors: Inwoo Ha, Seongnam-si (KR); Minsu Ahn, Seoul (KR); Minjung Son, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 15 days.

(21) Appl. No.: 15/208,810

(22) Filed: Jul. 13, 2016

(65) Prior Publication Data

US 2017/0084076 A1 Mar. 23, 2017

(30) Foreign Application Priority Data

Sep. 21, 2015 (KR) .................. 10-2015-0133396

(51) Int. Cl.
*G06T 15/60* (2006.01)
*G06T 1/20* (2006.01)
*G06T 17/10* (2006.01)

(52) U.S. Cl.
CPC .............. *G06T 15/60* (2013.01); *G06T 1/20* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 5,253,339 A | 10/1993 | Wells et al. | |
| 6,455,835 B1* | 9/2002 | Bernardini | G01B 11/2433 250/208.1 |
| 6,552,726 B2 | 4/2003 | Hurley et al. | |
| 7,158,133 B2 | 1/2007 | Hong et al. | |
| 7,167,181 B2 | 1/2007 | Duluk, Jr. et al. | |
| 7,466,314 B2 | 12/2008 | Loop et al. | |
| 7,719,544 B2 | 5/2010 | Boyd et al. | |
| 8,872,824 B1* | 10/2014 | Phillips | G06T 15/60 345/419 |

(Continued)

FOREIGN PATENT DOCUMENTS

JP 2861647 B2 12/1998
JP 2000-20746 A 1/2000

(Continued)

OTHER PUBLICATIONS

European Patent Office on April 6, 2017 for the corresponding EP Patent Application No. 16179257.7.

(Continued)

*Primary Examiner* — Yi Wang
(74) *Attorney, Agent, or Firm* — NSIP Law

(57) ABSTRACT

A shadow information storing method and apparatus is disclosed. The shadow information storing apparatus determines a shadow area through rendering a three-dimensional (3D) model based on light radiated from a reference virtual light source, determines a shadow feature value of a vertex of the 3D model based on a distance between a location of the vertex of the 3D model and the shadow area, and stores the determined shadow feature value.

16 Claims, 12 Drawing Sheets

(56) References Cited

U.S. PATENT DOCUMENTS

| | | | |
|---|---|---|---|
| 2001/0040999 A1 | 11/2001 | Fukuda | |
| 2003/0227457 A1 | 12/2003 | Pharr et al. | |
| 2005/0017974 A1* | 1/2005 | Hong | G06T 15/60 |
| | | | 345/426 |
| 2005/0134588 A1* | 6/2005 | Aila | G06T 15/60 |
| | | | 345/426 |
| 2006/0279570 A1* | 12/2006 | Zhou | G06T 15/60 |
| | | | 345/426 |
| 2007/0035545 A1 | 2/2007 | Hempel et al. | |
| 2007/0206008 A1 | 9/2007 | Kaufman et al. | |

FOREIGN PATENT DOCUMENTS

| | | |
|---|---|---|
| JP | 4111577 B2 | 4/2008 |
| KR | 1996-0012670 B1 | 9/1996 |
| KR | 10-2005-0058997 A | 6/2005 |
| KR | 10-2008-0019119 A | 3/2008 |
| KR | 10-2009-0082512 A | 7/2009 |

OTHER PUBLICATIONS

Chajdas, Matthäus G., et al. "High-Quality Shadows for Streaming Terrain Rendering." (2015).

Hasenfratz, J-M., et al. "A Survey of Real-time Soft Shadows Algorithms." Computer Graphics Forum. vol. 22. No. 4. Blackwell Publishing, Inc, 2003.

Matsushita, Yasuyuki, et al. "Lighting interpolation by shadow morphing using intrinsic lumigraphs." Computer Graphics and Applications, 2002. Proceedings. 10th Pacific Conference on. IEEE, 2002.

Wong, Tien-Tsin, et al. "Instant relighting of volumetric data." Medical Imaging 2003. International Society for Optics and Photonics, 2003.

Sintorn, Erik, et al. "Compact Precomputed Voxelized Shadows." ACM Transactions on Graphics (TOG) 33.4 (2014): 150. (8 pages in English).

* cited by examiner

3D RENDERING AND SHADOW INFORMATION STORING METHOD AND APPARATUS

CROSS-REFERENCE TO RELATED APPLICATION(S)

This application claims the benefit under 35 USC § 119(a) of Korean Patent Application No. 10-2015-0133396, filed on Sep. 21, 2015, in the Korean Intellectual Property Office, the entire disclosure of which is incorporated herein by reference for all purposes.

BACKGROUND

1. Field

The following description relates to three-dimensional (3D) computer graphics technology.

2. Description of Related Art

Three-dimensional (3D) rendering belongs to a field of computer graphics that renders a 3D model. 3D rendering is used for various applications, such as, for example, 3D game, virtual reality, animation, and movie. The 3D rendering may include rendering such as, for example, ray tracing rendering to render a 3D model by tracing a path through which light emitted from a light source is reflected from a surface of an object, radiosity rendering based on an indirect illumination effect, in addition to a direct illuminating effect, through reflection or diffused reflection of a direct illumination by an object, and rasterization rendering to render a 3D model by transforming vector data to a pixel pattern image.

3D rendering may generate a shadow and apply the shadow to a rendered image to provide a higher sense of reality. Here, the shadow refers to a dark area generated when light radiated from a virtual light source is hidden by an object, and may provide a sense of reality and a spatial impression to the rendered image. A shadow calculation used to determine such a shadow may be performed on all image frames and all pixels.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a shadow information storing method, including determining a shadow area through rendering a three-dimensional (3D) model, determining a shadow feature value of a vertex of the 3D model based on a distance between a location of the vertex and a boundary of the shadow area, and storing the determined shadow feature value.

The storing of the shadow feature value may include storing the shadow feature value by classifying the shadow feature value based on a location of a reference virtual light source.

The determining of the shadow feature value may include calculating a distance between the location of the vertex and the boundary of the shadow area, or a distance between the location of the vertex and a line extending from the boundary of the shadow area, and determining the shadow feature value based on the calculating.

The determining of the shadow feature value may include determining a sign of the shadow feature value based on whether the vertex is located in the shadow area.

The determining of the shadow feature value may include determining whether the shadow area is present in a polygon formed with the vertex and neighboring vertices of the vertex.

The determining of the shadow feature value may include setting shadow feature values of the vertices forming the polygon to be equal to the shadow feature value, in response to an absence of the shadow area from the polygon.

The determining of the shadow feature value may include setting shadow feature values of the vertices forming the polygon to be equal to the shadow feature value, in response to the vertices forming the polygon being located in the shadow area.

The determining of the shadow feature value may include determining the distance between the location of the vertex and the boundary of the shadow area, in response to a presence of the boundary of the shadow area in the polygon.

The storing of the shadow feature value may include classifying, into clusters, a type of a change in a shadow feature value in image frames generated by rendering the 3D model, and storing an index of a cluster corresponding to a change in the shadow feature value of the vertex among the clusters.

The determining of the shadow area may include dividing a section between neighboring vertices in the 3D model into a number of samples, and determining the boundary of the shadow area by tracing a moving path of light radiated from a reference virtual light source at locations of the samples.

The dividing of the section between the neighboring vertices may include dividing the section between the neighboring vertices into another number of samples that is greater than the number of samples, when the boundary of the shadow area is present in the section between the neighboring vertices.

In another general aspect, there is provided a three-dimensional (3D) rendering method to render a 3D model, the method including extracting, from shadow information, a shadow feature value of each vertex of the 3D model, determining a shadow feature value for each pixel by interpolating extracted shadow feature values, and determining a shadow area based on the shadow feature value determined for the each pixel.

The determining of the shadow feature value may include determining a shadow feature value of the each pixel comprised a polygon by interpolating shadow feature values of vertices forming the polygon.

The extracting of the shadow feature value may include extracting, from the shadow information, a shadow feature value of the each vertex for a reference virtual light source adjacent to a current virtual light source.

The determining of the shadow area may include determining the shadow area based on a sign of the shadow feature value determined for the each pixel.

The determining of the shadow area may include determining the shadow area by comparing the shadow feature value determined for the each pixel to a threshold value.

In another general aspect, there is provided a three-dimensional (3D) rendering method, including determining shadow information about a reference virtual light source based on light radiated from the reference virtual light source, and determining shadow information about a current virtual light source by interpolating shadow information about reference virtual light sources.

The determining of the shadow information about the current virtual light source may include determining the shadow information about the current virtual light source by interpolating shadow information about reference virtual light sources adjacent to the current virtual light source.

The determining of the shadow information about the reference virtual light source may include determining shadow information about a first reference virtual light source in a first image frame, and determining shadow information about a second reference virtual light source in a second image frame.

The determining of the shadow information about the current virtual light source may include determining the shadow information about the current virtual light source by interpolating the shadow information about the first reference virtual light source in the first image frame and the shadow information about the second reference virtual light source in the second image frame.

In another general aspect, there is provided a shadow information storing apparatus, including a processor configured to determine a shadow area by rendering a three-dimensional (3D) model, to determine a shadow feature value of a vertex of the 3D model based on a distance between a location of the vertex and a boundary of the shadow area, and to store the determined shadow feature value.

In another general aspect, there is provided a three-dimensional (3D) rendering apparatus, including a processor configured to extract a shadow feature value of each vertex of a 3D model from shadow information, to determine a shadow feature value for each pixel by interpolating extracted shadow feature values, and to determine a shadow area based on the shadow feature value determined for the each pixel.

The processor may include at least one graphics processing unit (GPU), and the shadow information may be stored in a texture buffer of the GPU.

In another general aspect, there is provided a three-dimensional (3D) rendering apparatus, including a processor configured to determine shadow information about a reference virtual light source based on light radiated from the reference virtual light source, and to determine shadow information about a current virtual light source by interpolating shadow information about reference virtual light sources.

Other features and aspects will be apparent from the following detailed description, the drawings, and the claims.

Figure 1:
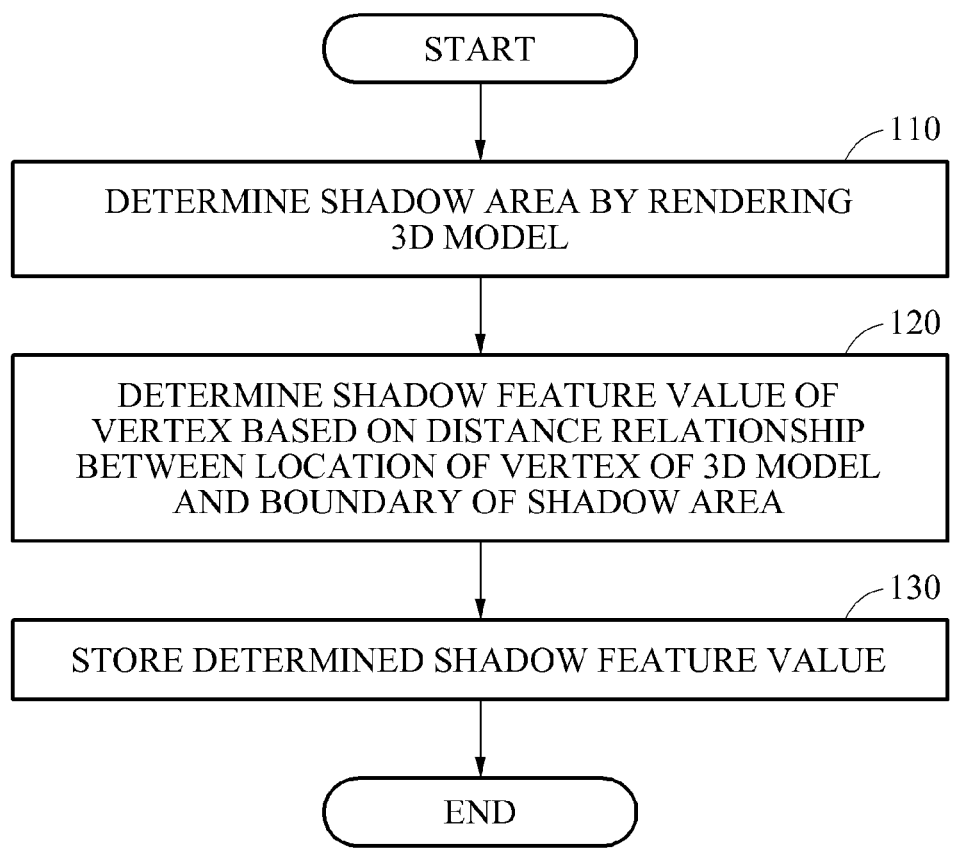
FIG. 1 is a diagram illustrating an example of a shadow information storing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The terminology used herein is for the purpose of describing particular examples only and is not to be limiting of the examples. As used herein, the singular forms "a," "an," and "the" are intended to include the plural forms as well, unless the context clearly indicates otherwise. In addition, terms such as first, second, A, B, (a), (b), and the like may be used herein to describe components. Each of these terminologies is not used to define an essence, order or sequence of a corresponding component but used merely to distinguish the corresponding component from other component(s).

Hereinafter, rendering a three-dimensional (3D) model may include determining a shadow area for a 3D model based on light radiated from a virtual light source providing an illumination effect to the 3D model. In an example, the virtual light source may include a direct light source and an indirect light source. The direct light source refers to a light source that emits light directly to the 3D model, and the indirect light source refers to a light source that emits light from an area in which the light emitted from the direct light source is reflected, diffracted, or refracted.

FIG. 1 is a diagram illustrating an example of a shadow information storing method. The shadow information storing method may be performed by a shadow information storing apparatus including at least one processor. The shadow information storing apparatus may determine shadow information by rendering a 3D model and store the determined shadow information. The stored shadow information may be used to calculate a shadow of the 3D model when the 3D model is rendered by a 3D rendering apparatus. The shadow information may include at least one value to calculate the shadow of the 3D model.

The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently.

Referring to FIG. 1, in 110, the shadow information storing apparatus determines a shadow area by rendering a 3D model. The shadow information storing apparatus may render the 3D model based on light radiated from a reference virtual light source disposed at a location. In the rendering, the shadow information storing apparatus may determine the shadow area for the 3D model using various methods, such as, for example, a ray-tracing method, or a shadow map method.

When using the ray-tracing method, the shadow information storing apparatus may divide a section between neighboring vertices among vertices included in the 3D model into a number of samples, for example, 10 samples, and determine a boundary of the shadow area by tracing a moving path of light radiated from the reference virtual light source at a location of each sample. In an example, when the boundary of the shadow area is present in the section between the neighboring vertices, the shadow information storing apparatus may divide the section between the neighboring vertices into a greater number of samples, for example, 20 samples, and trace a moving path of light at a location of each sample to determine a more accurate location of the boundary of the shadow area.

In 120, the shadow information storing apparatus determines a shadow feature value of a vertex of the 3D model based on a distance relationship between a location of the vertex and the boundary of the shadow area. The shadow feature value of the vertex may include information about whether the vertex is located in the shadow area and information about a distance between the vertex and the boundary of the shadow area. For example, when the shadow feature value of the vertex is a negative number, it is indicated that the vertex may be located in the shadow area. In another example, when the shadow feature value is a positive number, it is indicated that the vertex may be located in a non-shadow area, or a bright area. As a magnitude of the shadow feature value increases, the distance between the vertex and the boundary of the shadow area increases. In another example, as the magnitude of the shadow feature value decreases, the distance between the vertex and the boundary of the shadow area decreases.

When the shadow area is determined, the shadow information storing apparatus may determine whether the shadow area is present in a polygon formed with the vertex and neighboring vertices of the vertex. The polygon, for example, a triangle, may be included in the 3D model and be formed with a plurality of vertices. When the shadow area is absent from the polygon, the shadow information storing apparatus may set shadow feature values of the vertices forming the polygon to be an equal value, for example, +1. When all the vertices forming the polygon are present in the shadow area, the shadow information storing apparatus may set the shadow feature values of the vertices forming the polygon to be an equal value, for example, −1.

When the boundary of the shadow area is present in the polygon, the shadow information storing apparatus may calculate the distance between the location of the vertex and the boundary of the shadow area. The shadow information storing apparatus may calculate the distance between the location of the vertex and the boundary of the shadow area, or a line extending from the boundary, and determine the shadow feature value based on the calculation.

In an example, the shadow information storing apparatus may calculate the distance based on a pixel. For example, in response to a presence of the vertex in the non-shadow area, the shadow information storing apparatus may calculate a distance from the vertex to a nearest pixel included in the shadow area. In response to a presence of the vertex in the shadow area, the shadow information storing apparatus may calculate a distance from the vertex to a nearest pixel included in the non-shadow area.

The shadow information storing apparatus may determine a sign of a shadow feature value based on whether the vertex is located in the shadow area or outside the shadow area. For example, the shadow information storing apparatus may set a sign of the shadow feature value to be a positive number in response to the presence of the vertex in the shadow area, and to be a negative number in response to the presence of the vertex in the non-shadow area.

In 130, the shadow information storing apparatus stores the shadow feature value determined for each vertex. In an example, the shadow information storing apparatus may normalize shadow feature values of vertices, and store the normalized shadow feature values. The shadow information storing apparatus may store the shadow feature values by classifying the shadow feature values by a location of the reference virtual light source and each vertex of the 3D model.

In an example, the shadow information storing apparatus may store the shadow feature values by compressing a shadow feature value for each vertex to reduce a magnitude of data to be stored. In an example, for numerous vertices of a 3D model there may be no change in a shadow or there may be only a small state change in a shadow. Thus, the shadow information storing apparatus may not have to store all changes in a shadow feature value of a vertex in image frames to be generated by rendering the 3D model, but may store the shadow feature value more efficiently using a cluster and an index indicating the cluster. For example, the shadow information storing apparatus may classify a type of a change in a shadow feature value into a plurality of clusters, and store an index of a cluster corresponding to a type of a change in a shadow feature value of a vertex when storing the shadow feature value. In a case of storing the shadow feature values of the vertices using a cluster and an index, redundancy of data to be stored may be eliminated, and thus a quantity of data to be stored may be reduced. Thus, when a shadow calculation, or operation, is performed by a 3D rendering apparatus, the 3D rendering apparatus may extract the shadow feature values of the vertices based on information on the clusters and indices allocated to the vertices.

When a shadow feature value for each vertex with respect to a location of the reference virtual light source is determined and stored, the shadow information storing apparatus may dispose the reference virtual light source at another location, and perform operations 110 through 130 again based on the reference virtual light source disposed at another location. The reference virtual light source may be disposed at various locations in a 3D space, and a shadow feature value of each vertex based on each location of the reference virtual light source may be determined and stored. Alternatively, the shadow information storing apparatus may perform operations 110 through 130 by changing a direction of the reference virtual light source and store a shadow feature value of each vertex based on each direction of the reference virtual light source.

Figure 2:
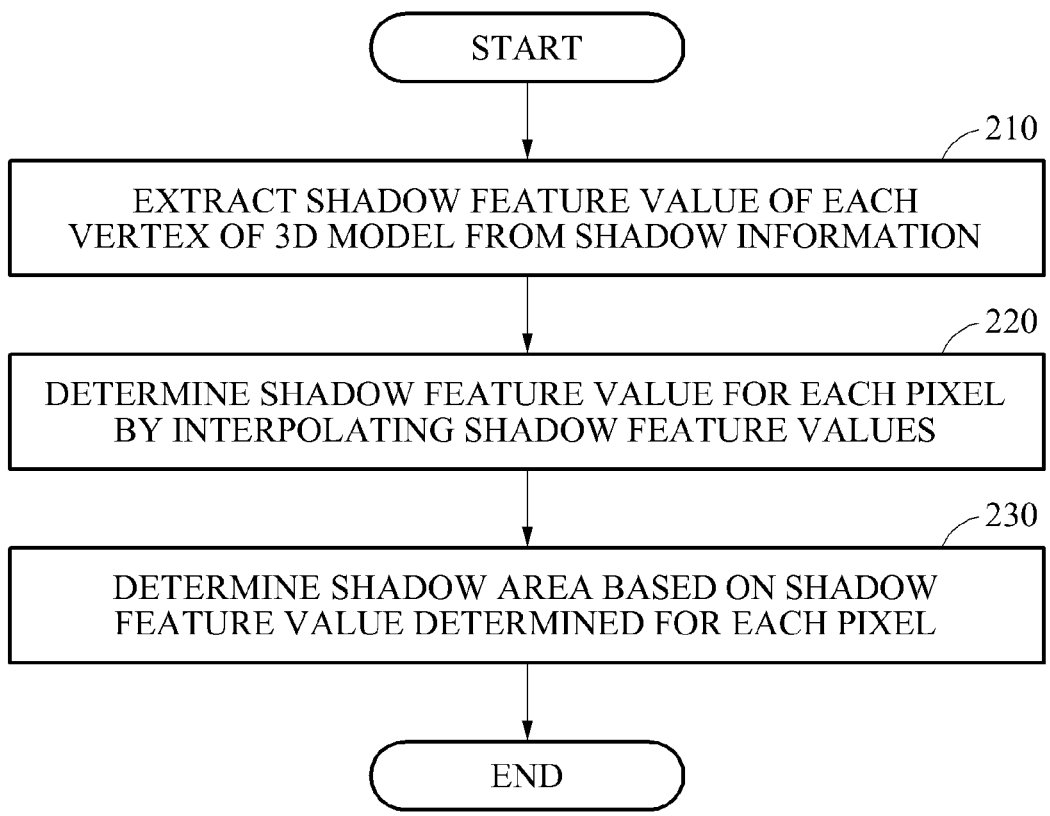
FIG. 2 is a diagram illustrating an example of a three-dimensional (3D) rendering method.

FIG. 2 is a diagram illustrating an example of a 3D rendering method in accordance with an embodiment. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. In addition to the description of FIG. 2 below, the above descriptions of FIG. 1, are also applicable to FIG. 2, and are incorporated herein by reference. Thus, the above description may not be repeated here.

The 3D rendering method may be performed by a 3D rendering apparatus including at least one processor. The 3D rendering apparatus may calculate a shadow of a 3D model using shadow information determined through the shadow information storing method described with reference to FIG. 1. The 3D rendering apparatus may calculate the shadow by interpolating the shadow information.

Referring to FIG. 2, in 210, the 3D rendering apparatus extracts a shadow feature value of each vertex of a 3D model from the determined shadow information. The 3D rendering apparatus may extract, from the shadow information, shadow feature value information about a reference virtual light source adjacent to a current virtual light source. For example, the 3D rendering apparatus may select a reference virtual light source disposed at a location close to a location of the current virtual light source among reference virtual light sources disposed at locations defined in the shadow information, and extract shadow feature value information determined for the selected reference virtual light source. A single reference virtual light source may be selected. In another example, a plurality of reference virtual light sources may be selected. For example, when a plurality of reference virtual light sources is selected, shadow feature value information about each reference virtual light source may be extracted. The shadow feature value information may include information about a shadow feature value determined for each vertex when a reference virtual light source is disposed at a location.

In 220, the 3D rendering apparatus determines a shadow feature value for each pixel by interpolating the extracted shadow feature values. For example, the 3D rendering apparatus may determine a shadow feature value for each of pixels included in a polygon of the 3D model by interpolating shadow feature values of vertices forming the polygon. In an example, the interpolating of the shadow feature values may be automatically performed through a rasterization process. The 3D rendering apparatus may determine whether each pixel is included in a shadow area based on the shadow feature value of each pixel determined through the interpolating, and determine a distance between a location of each pixel and a boundary of the shadow area.

In 230, the 3D rendering apparatus determines the shadow area based on the shadow feature value determined for each pixel. The 3D rendering apparatus may determine whether a pixel is included in the shadow area by determining whether a shadow feature value of the pixel satisfies a condition. In an example, the condition may be preset or set in advance.

In an example, the 3D rendering apparatus may determine the shadow area based on a sign of the shadow feature value determined for each pixel. For example, in response to the shadow feature value of the pixel being a negative number, the 3D rendering apparatus may determine that the pixel is included in the shadow area. In another example, in response to the shadow feature value of the pixel being a positive number, the 3D rendering apparatus may determine that the pixel is included in a non-shadow area. In response to the shadow feature value of the pixel being "0," the 3D rendering apparatus may determine that the pixel is located on the boundary of the shadow area.

In another example, the 3D rendering apparatus may determine the shadow area by comparing the shadow feature value determined for each pixel to a thresholds value. For example, in response to the shadow feature value of the pixel being less than the threshold value, the 3D rendering apparatus may determine that the pixel is included in the shadow area. In other cases, the 3D rendering apparatus may determine that the pixel is included in the non-shadow area. The boundary of the shadow area may be more clearly determined using the threshold value.

As described in the foregoing, a shadow calculation of a 3D model may be enabled through interpolation, and thus a rendering speed may be improved and an amount of resources needed for the rendering may be reduced.

Figure 3:
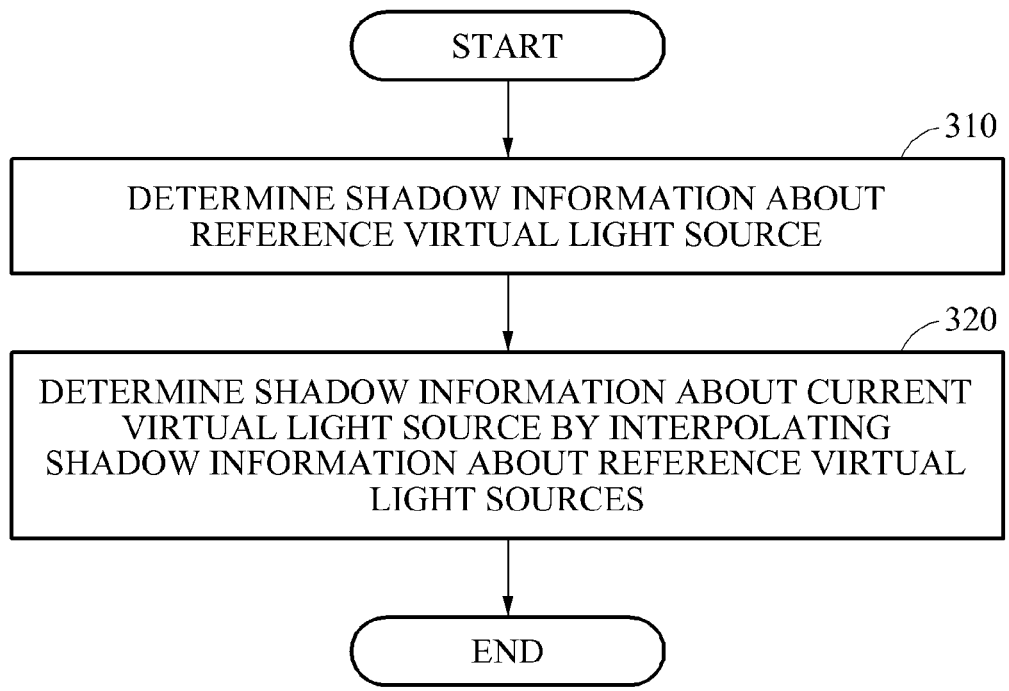
FIG. 3 is a diagram illustrating an example of a 3D rendering method.

FIG. 3 is a diagram illustrating an example of a 3D rendering method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. In addition to the description of FIG. 3 below, the above descriptions of FIGS. 1-2, are also applicable to FIG. 3, and are incorporated herein by reference. Thus, the above description may not be repeated here.

The 3D rendering method may be performed by a 3D rendering apparatus including at least one processor. The 3D rendering apparatus may calculate a shadow in a process of rendering a 3D model. The 3D rendering apparatus may determine shadow information about a current virtual light source by interpolating shadow information about reference virtual light sources adjacent to the current virtual light source.

Referring to FIG. 3, in 310, the 3D rendering apparatus determines shadow information about a reference virtual light source based on light radiated from the reference virtual light source. For example, the 3D rendering apparatus may determine a shadow area with respect to the reference virtual light source using, for example, a ray-tracing method or a shadow map method, and store information about the shadow area for each vertex.

In 320, the 3D rendering apparatus determines shadow information about a current virtual light source by interpolating shadow information about reference virtual light sources. The 3D rendering apparatus may determine a shadow area with respect to the current virtual light source by interpolating information about shadow areas determined for reference virtual light sources adjacent to the current virtual light source. A processing speed for a shadow calculation may be improved through such an interpolation process for shadow information.

The 3D rendering apparatus may determine shadow information for each virtual light source for which a shadow calculation is needed through the process described above, and perform shading based on the determined shadow information.

In another example, the 3D rendering apparatus may determine shadow information about a reference virtual light source in different image frames, and determine shadow information about the current virtual light source by interpolating the determined shadow information. For example, in 310, the 3D rendering apparatus may determine shadow information about a first reference virtual light source in a first image frame, and determine shadow information about a second reference virtual light source in a second image frame. In 320, the 3D rendering apparatus may determine the shadow information about the current virtual light source by interpolating the shadow information about the first reference virtual light source determined in the first image frame and the shadow information about the second reference virtual light source determined in the second image frame.

Figure 4:
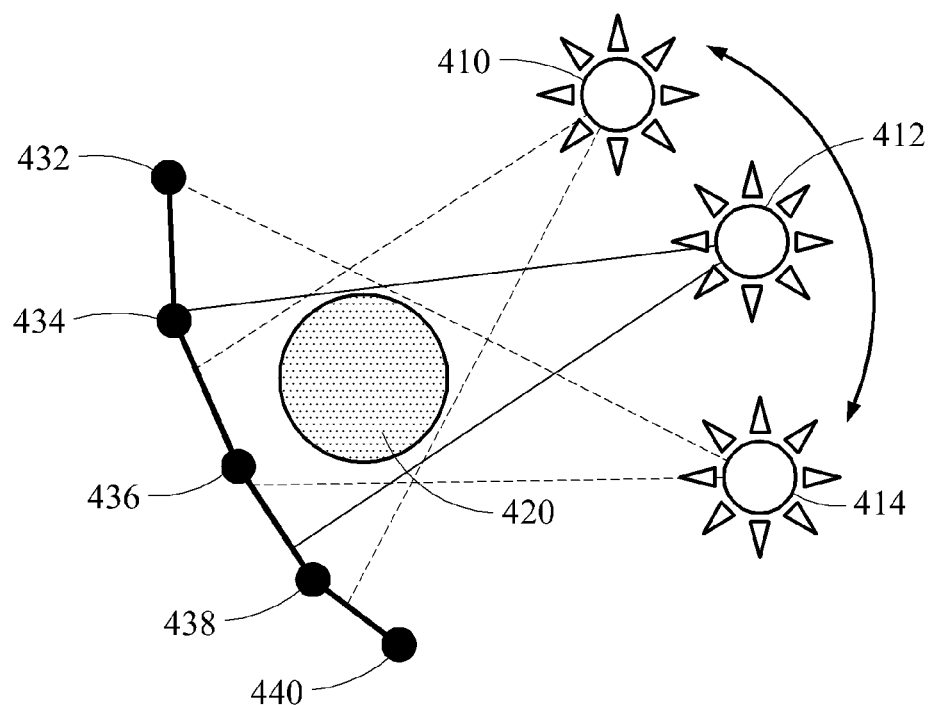
FIG. 4 is a diagram illustrating an example of a process of determining information about a shadow area for each vertex.

FIG. 4 is a diagram illustrating an example of a process of determining information about a shadow area for each vertex. A shadow information storing apparatus may calculate, in advance, shadow information based on a location of each reference virtual light source, and store the calculated shadow information for each vertex. Referring to FIG. 4, the shadow information storing apparatus determines a shadow area generated when light radiated from a reference virtual light source is hidden by an object 420. The shadow information storing apparatus stores information about the shadow area for each vertex, such as, for example, a vertex 432, a vertex 434, a vertex 436, a vertex 438, and a vertex 440.

For example, when the reference virtual light source is disposed at a location 410 in a 3D space, the shadow information storing apparatus may store information about a shadow area generated when light radiated from the reference virtual light source at the location 410 is hidden by the object 420 for each of the vertices 432 through 440. The information about the shadow area may include information about whether each vertex is located in the shadow area when the reference virtual light source radiates light at the location 410 and information about a distance from each vertex to a boundary of the shadow area.

When such a process is completed at the location 410, the shadow information storing apparatus may dispose the reference virtual light source at a location 412, and determine and store, for each vertex, information about a shadow area generated when light radiated from the reference virtual light source at the location 412 is hidden by the object 420 through the described process. Similarly, when such a process is completed at the location 412, the shadow information storing apparatus may dispose the reference virtual light source at a location 414, and determine and store, for each vertex, information about a shadow area through the described process.

Figure 5A:
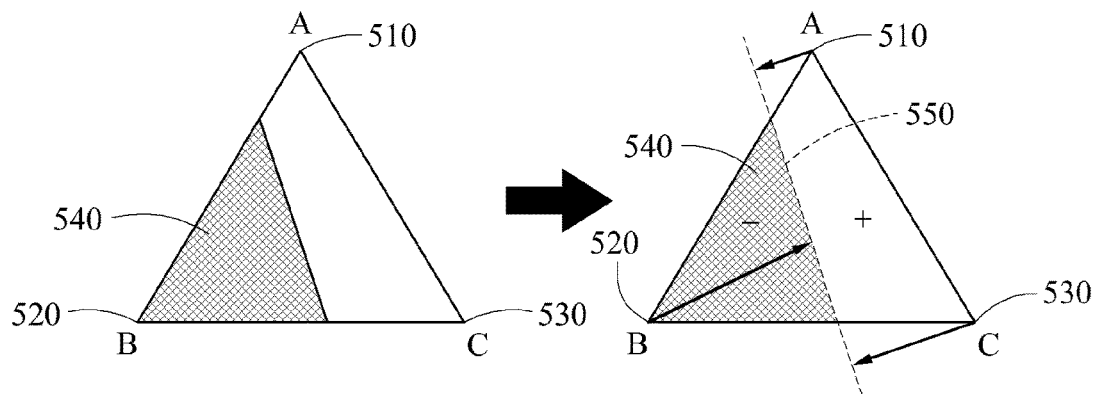
FIGS. 5A and 5B are diagrams illustrating examples of a process of determining a shadow feature value.
Figure 5B:
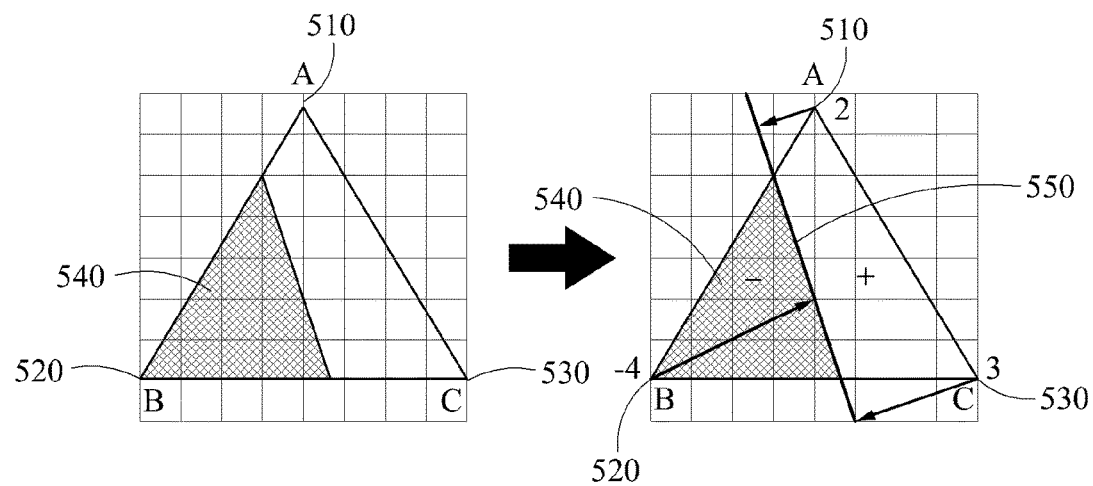

FIGS. 5A and 5B are diagrams illustrating examples of a process of determining a shadow feature value. In FIGS. 5A and 5B, it is assumed that a vertex A 510, a vertex B 520, and a vertex C 530 of a 3D model form a polygon and a shadow area 540 is present in the polygon. In an example, the shadow area 540 may be determined through a ray-tracing method or a shadow map method.

Referring to FIG. 5A, a shadow information storing apparatus calculates a shadow feature value for each of the vertices 510, 520, and 530 based on a distance relationship between each of the vertices 510, 520, and 530 and a boundary 550 of the shadow area 540. For example, the shadow information storing apparatus may calculate a distance between the vertex A 510 and a line extending from the boundary 550 of the shadow area 540, and determine a shadow feature value of the vertex A 510 by setting a sign of the calculated distance to be a positive number. Similarly, the shadow information storing apparatus may calculate a distance between the vertex C 530 and a line extending from the boundary 550 of the shadow area 540, and determine a shadow feature value of the vertex C 530 by setting a sign of the calculated distance to be a positive number. Here, in a case of the vertex B 520, the shadow information storing apparatus may calculate a distance between the vertexB 520 and the boundary 550 of the shadow area 540, and determine a shadow feature value of the vertex B 520 by setting a sign of the calculated distance to be a negative number. Since the vertex A 510 and the vertex C 530 are located in a non-shadow area, the distances may be set to be the positive numbers. Since the vertex B 520 is located in the shadow area 540, the distance may be set to be the negative number.

Referring to FIG. 5B, the shadow information storing apparatus determines a distance between each of vertices, for example, a vertex A 510, a vertex B 520, and a vertex C 530, and a boundary 550 of a shadow area 540 based on a pixel. The shadow information storing apparatus calculates a distance between each of the vertices 510, 520, and 530 and a pixel in which a state of a shadow changes, based on the shadow area 540 rendered in pixels. When the vertex A 510 is located in a non-shadow area, the shadow information storing apparatus may calculate a distance between the vertex A 510 and a nearest pixel included in the shadow area 540. When the vertex B 520 is located in the shadow area 540, the shadow information storing apparatus may calculate a distance between the vertex B 520 and a nearest pixel included in the non-shadow area.

Figure 6A:
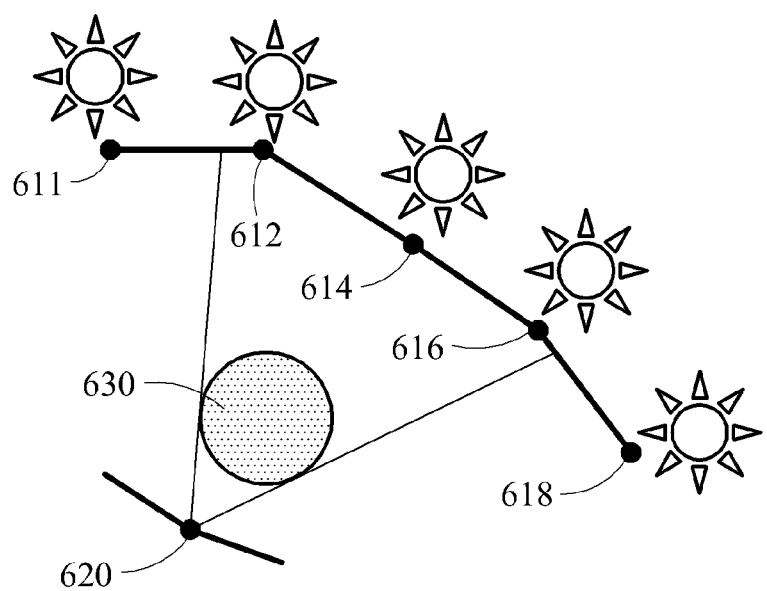
FIGS. 6A and 6B are diagrams illustrating examples of a process of storing a shadow feature value.
Figure 6B:
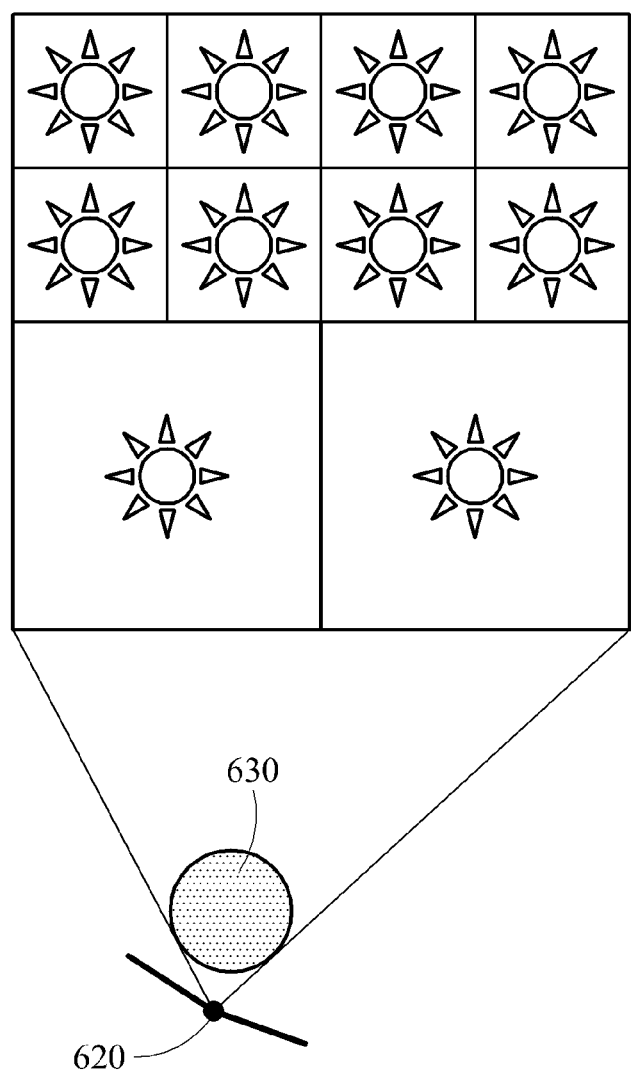

FIGS. 6A and 6B are diagrams illustrating an example of storing a shadow feature value.

Referring to FIG. 6A, a shadow information storing apparatus determines a shadow area generated by an object 630 based on a reference light source being disposed at a location, for example, a location 611, a location 612, a location 614, a location 616, and a location 618, in a 3D space and determines a shadow feature value of a vertex 620. Rather than determining a shadow feature value of the vertex 620 based on all locations at which a reference virtual light source may be disposed, the shadow information storing apparatus determines the shadow feature value of the vertex 620 using interpolation in a section between neighboring locations among the locations 611, 612, 614, 616, and 618. For example, the shadow information storing apparatus may determine the shadow feature value of the vertex 620 when the reference virtual light source is disposed between the locations 611 and 612, by interpolating a shadow feature value of the vertex 620 when the reference virtual light source is disposed at the location 611 and a shadow feature value of the vertex 620 when the reference virtual light source is disposed at the location 612.

Referring to FIG. 6B, the shadow information storing apparatus configures hierarchical locations at which a reference virtual light source is disposed in a 3D space. Here, the reference virtual light source may be disposed more densely. For example, the locations of the reference virtual light source may be more densely arranged in a section in which a change in a shadow feature value is large based on a movement of a location of the reference virtual light source. Similarly to the example illustrated in FIG. 6A, the shadow information storing apparatus may determine, through interpolation, a shadow feature value for a location at which the reference virtual light source is not disposed.

Figure 7:
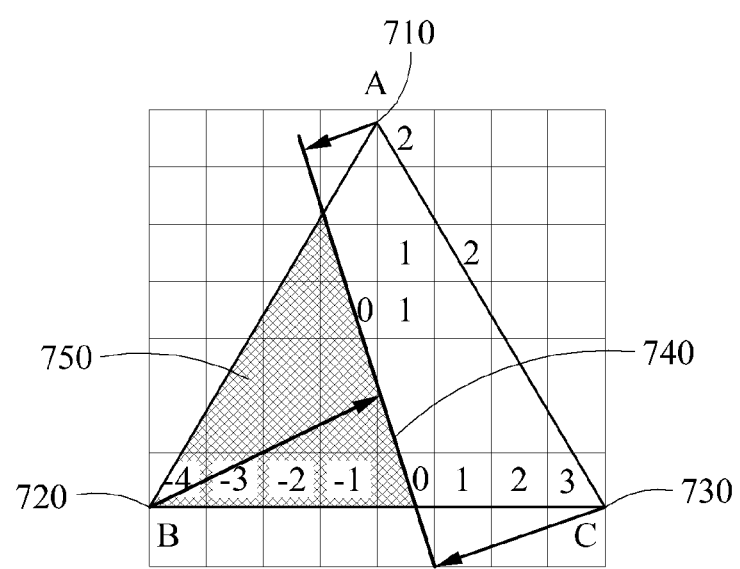
FIG. 7 is a diagram illustrating an example of a process of determining a shadow area based on predetermined shadow information.

FIG. 7 is a diagram illustrating an example of a process of determining a shadow area based on predetermined shadow information. In the example of FIG. 7, a shadow area is determined in a polygon of a 3D model formed with a vertex A 710, a vertex B 720, and a vertex C 730.

Referring to FIG. 7, a 3D rendering apparatus extracts a shadow feature value of each of the vertices 710, 720, and 730 from predetermined shadow information based on a location of a current virtual light source. In an example, a shadow feature value extracted for each of the vertices 710, 720, and 730 are +2, −4, and +3, respectively. The 3D rendering apparatus may determine whether a vertex is located in a shadow area 750 based on a sign of a shadow feature value. For example, the 3D rendering apparatus may determine that a vertex having a negative number of a shadow feature value is located in the shadow area 750, and a vertex having a positive number of a shadow feature value is located in a non-shadow area.

The 3D rendering apparatus determines a shadow feature value for each pixel in the polygon by interpolating the shadow feature values of the vertices 710, 720, and 730. For example, the shadow feature value for each pixel may be determined through an interpolation process of rasterization performed based on the shadow feature values of the vertices 710, 720, and 730. The shadow feature value determined for each pixel may include information about a distance from a pixel to a boundary 740 of the shadow area 750 and information as to whether the pixel is included in the shadow area 750, for example.

In an example, the 3D rendering apparatus determines an area in which a shadow feature value of a pixel is a negative number to be the shadow area 750, and an area in which a shadow feature value of a pixel is a positive number to be the non-shadow area. Points at which the shadow feature value is 0 indicate the boundary 740 of the shadow area 750.

In another example, the 3D rendering apparatus determines, to be the shadow area 750, an area in which a shadow feature value of a pixel is less than a threshold value by comparing the shadow feature value to the threshold value. In another example, the 3D rendering apparatus determines, to be the non-shadow area, an area in which the shadow feature value is greater than or equal to the threshold value. The 3D rendering apparatus may express the boundary 740 of the shadow area 750 as clearly distinguishable, or as softly changing.

When signs of the shadow feature values of the vertices 710, 720, and 730 being the same, the 3D rendering apparatus may determine that there is no boundary of a shadow area in the polygon formed with the vertices 710, 720, and 730. When the signs of the shadow feature values of the vertices 710, 720, and 730 are negative, the 3D rendering apparatus may determine that the polygon formed with the vertices 710, 720, and 730 is included in the shadow area. When signs of the shadow feature values of the vertices 710, 720, and 730 are positive, the 3D rendering apparatus may determine that the polygon is included in the non-shadow area.

Figure 8:
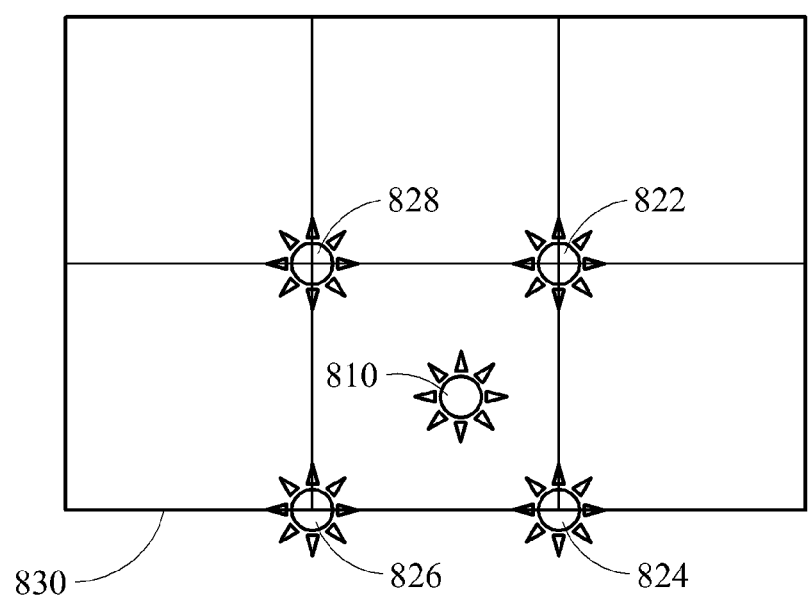
FIG. 8 is a diagram illustrating an example of a process of determining shadow information about a current virtual light source based on shadow information about a reference virtual light source.

FIG. 8 is a diagram illustrating an example of a process of determining shadow information about a current virtual light source based on shadow information about a reference virtual light source.

Referring to FIG. 8, a 3D rendering apparatus determines shadow information about a reference virtual light source at locations adjacent to a location 810 of a current virtual light source, for example, a location 822, a location 824, a location 826, and a location 828, to determine shadow information about the current virtual light source, and determines the shadow information about the current virtual light source by interpolating the determined shadow information about the reference virtual light source at the locations 822, 824, 826, and 828. The shadow information may include a shadow feature value determined for each vertex. For example, the locations 822, 824, 826, and 828 at which the reference virtual light source is disposed may be determined to be in a form of a grid 830.

The shadow information about the reference virtual light source determined at the locations 822, 824, 826, and 828 may be determined over image frames. For example, in a first image frame, shadow information about the reference virtual light source disposed at the location 822 may be determined. Similarly, in a second image frame, shadow information about the reference virtual light source disposed at the location 824 may be determined. The 3D rendering apparatus may determine the shadow information about the current virtual light source by interpolating the shadow information of reference virtual light sources in different image frames.

Figure 9:
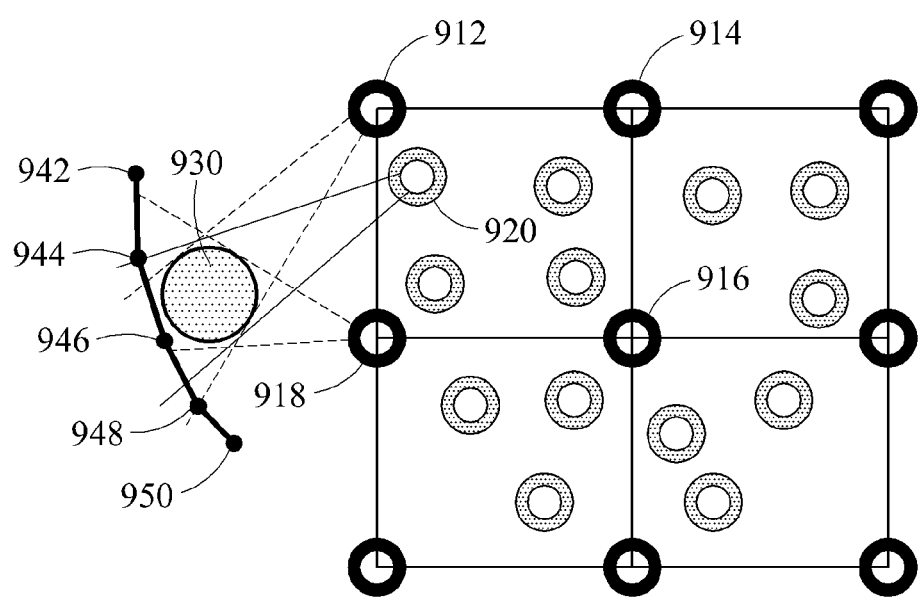
FIG. 9 is a diagram illustrating an example of a shadow calculation process with respect to indirect light sources.

FIG. 9 is a diagram illustrating an example of a shadow calculation process with respect to indirect light sources. Referring to FIG. 9, a 3D rendering apparatus determines a shadow area generated by an occlusion by an object 930 based on locations of reference indirect light sources, for example, a location 912, a location 914, a location 916, and a location 918, and determines shadow information associated with the shadow area. The 3D rendering apparatus may determine shadow information about another indirect light source by interpolating the shadow information determined for each of the locations 912, 914, 916, and 918 of the reference indirect light sources. For example, the 3D rendering apparatus may determine the shadow information by performing a shadow calculation, or operation, on the locations 912, 914, 916, and 918 of the reference indirect light sources, and determine shadow information about a current indirect light source 920 by interpolating the shadow information determined based on the locations 912, 914, 916, and 918 of the reference indirect light sources.

Figure 10:
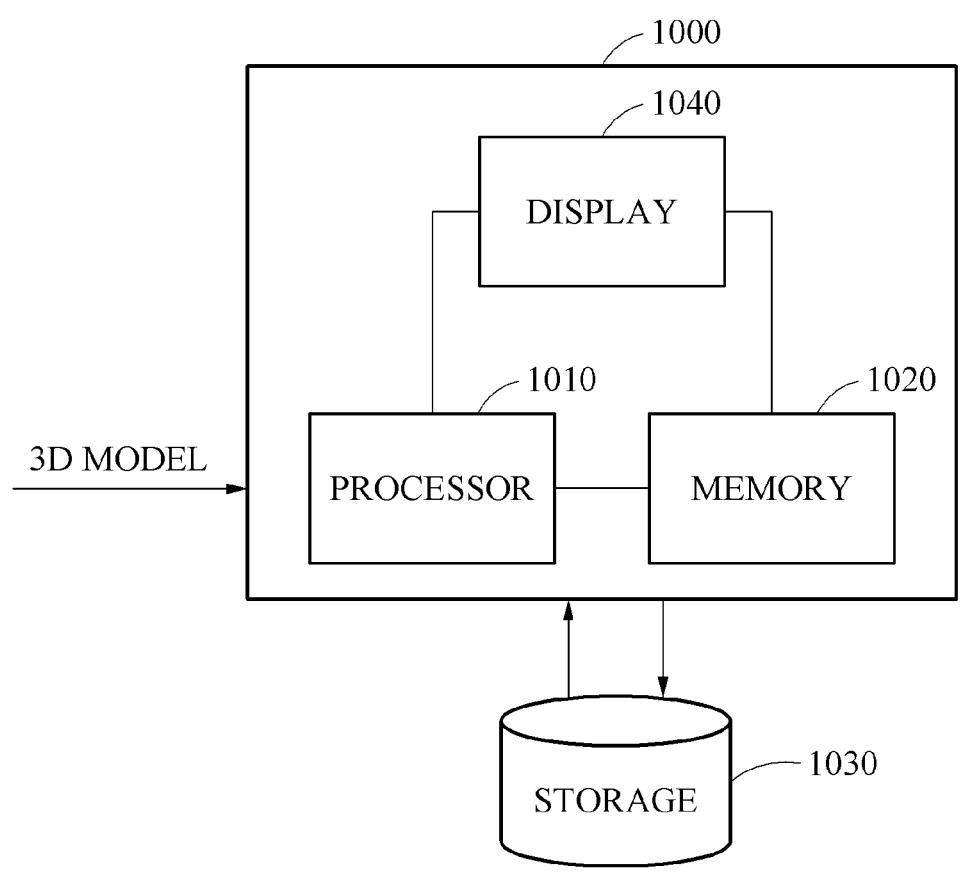
FIG. 10 is a diagram illustrating an example of a shadow information storing apparatus.

FIG. 10 is a diagram illustrating an example of a shadow information storing apparatus 1000. Referring to FIG. 10, the shadow information storing apparatus 1000 includes a processor 1010, a memory 1020, and a display 1040. The memory 1020 communicates with the processor 1010, and stores instructions implementable by the processor 1010, data to be processed by the processor 1010, or data processed by the processor 1010. The processor 1010 accesses the memory 1020 to implement the instructions stored in the memory 1020.

The processor 1010 performs at least one operation described with reference to FIGS. 1 through 9. When a 3D model is input to the shadow information storing apparatus 1000, the processor 1010 determines a shadow area by rendering the input 3D model. The processor 1010 determines a shadow feature value of each vertex of the 3D model based on a distance relationship between a location of each vertex of the 3D model and a boundary of the shadow area, and stores the determined shadow feature values in a storage 1030.

In an example, the processor 1010 may output a rendered image of a 3D model with the shadow information to an output, such as, for example, a display 1040 of the shadow information storing apparatus 1000. A display 1040 may be a physical structure that includes one or more hardware components that provide the ability to display a rendered user interface or 3D space and/or receive user input. The display 1040 can encompass any combination of display region, gesture capture region, a touch sensitive display, and/or a configurable area. The display 1040 can be embedded in the shadow information storing apparatus 1000 or may be an external peripheral device that may be attached and detached from the shadow information storing apparatus 1000. The display 1040 may be a single-screen or a multi-screen display. A single physical screen can include multiple displays that are managed as separate logical displays permitting different content to be displayed on separate displays although part of the same physical screen. The display 1040 may also be implemented as an eye glass display (EGD), which includes one-eyed glass or two-eyed glasses.

Figure 11:
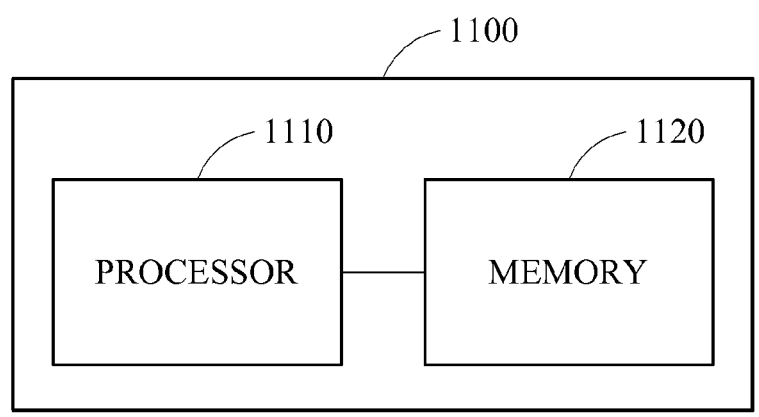
FIG. 11 is a diagram illustrating an example of a 3D rendering apparatus.

FIG. 11 is a diagram illustrating an example of a 3D rendering apparatus 1100. Referring to FIG. 11, the 3D rendering apparatus 1100 includes a processor 1110 and a memory 1120. The memory 1120 communicates with the processor 1110, and stores instructions implementable by the processor 1110, data to be processed by the processor 1110, or data processed by the processor 1110. The processor 1110 accesses the memory 1120 to implement the instructions stored in the memory 1120. In an example, the processor 1110 may include at least one graphics processing unit (GPU) to render a 3D model.

In an example, the processor 1110 may perform at least one operation described with reference to FIGS. 1 through 9. When a 3D model and shadow information are input to the 3D rendering apparatus 1100, the processor 1110 renders the 3D model based on the 3D model and the shadow information and generates a rendered image including a shadow area. The shadow information may be stored in a texture buffer in the GPU, and the processor 1110 calculates a shadow value for the 3D model by referring to the shadow information stored in the texture buffer. The processor 1110 extracts a shadow feature value of each vertex of the 3D model from the shadow information, and determines a shadow feature value for each pixel by interpolating the extracted shadow feature values. The processor 1110 determines the shadow area based on the shadow feature value determined for each pixel.

In another example, the processor 1110 determines shadow information about a reference virtual light source based on light radiated from the reference virtual light source, and determines shadow information about a current virtual light source by interpolating shadow information about reference virtual light sources. The processor 1110 determines the shadow area for the 3D model based on the shadow information determined for each virtual light source. In an example, the processor 1110 may output a rendered image of a 3D model with the shadow area to an output, such as, for example, a display 1040 of the shadow information storing apparatus 1000 of FIG. 10.

The apparatuses, units, modules, devices, and other components illustrated in FIGS. 10 and 11 that perform the operations described herein with respect to FIGS. 1-9 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1, 2, and 3. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described herein are performed by computing hardware as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A shadow information storing method, comprising:
   determining, at a processor, a shadow area through rendering a three-dimensional (3D) model;
   determining, at the processor, a shadow feature value of a vertex of the 3D model based on a distance between a location of the vertex and a boundary of the shadow area; and
   storing the determined shadow feature value by classifying the shadow feature value based on a location of a reference virtual light source,
   wherein the shadow feature value of the vertex comprises information on whether the vertex is located in the shadow area and information on a distance between the vertex and the boundary of the shadow area, and
   wherein the storing of the shadow feature value comprises:
      classifying, into clusters, a type of a change in a shadow feature value in image frames generated by the rendering of the 3D model; and
      storing an index of a cluster corresponding to a change in the shadow feature value of the vertex among the clusters.

2. The method of claim 1, wherein the determining of the shadow feature value comprises:
   calculating a distance between the location of the vertex and the boundary of the shadow area, or a distance between the location of the vertex and a line extending from the boundary of the shadow area; and
   determining the shadow feature value based on the calculated distance.

3. The method of claim 1, wherein the determining of the shadow feature value comprises:
   determining a sign of the shadow feature value based on a determination of whether the vertex is located in the shadow area.

4. The method of claim 1, wherein the determining of the shadow feature value comprises:
   determining whether the shadow area is present in a polygon formed with the vertex and neighboring vertices of the vertex.

5. The method of claim 4, wherein the determining of the shadow feature value comprises:

setting shadow feature values of the vertices forming the polygon to be equal to the shadow feature value, in response to a determination that the shadow area is absent from the polygon.

6. The method of claim 4, wherein the determining of the shadow feature value comprises:
   setting shadow feature values of the vertices forming the polygon to be equal to the shadow feature value, in response to the vertices forming the polygon being determined to be located in the shadow area.

7. The method of claim 4, wherein the determining of the shadow feature value comprises:
   determining the distance between the location of the vertex and the boundary of the shadow area, in response to a presence of the boundary of the shadow area in the polygon.

8. The method of claim 1, wherein the determining of the shadow area comprises:
   dividing a section between neighboring vertices in the 3D model into a number of samples; and
   determining the boundary of the shadow area by tracing a moving path of light radiated from a reference virtual light source at locations of the samples.

9. The method of claim 8, wherein the dividing of the section between the neighboring vertices comprises:
   dividing the section between the neighboring vertices into another number of samples that is greater than the number of samples, in response to the boundary of the shadow area being present in the section between the neighboring vertices.

10. A non-transitory computer readable medium comprising computer program being configured to cause a computer to perform the method of claim 1.

11. A three-dimensional (3D) rendering method to render a 3D model, the method comprising:
   extracting, from shadow information, a shadow feature value of a vertex of the 3D model;
   determining a shadow feature value for each pixel of a polygon by interpolating extracted shadow feature values of vertices forming the polygon; and
   determining a shadow area based on the shadow feature value determined for the each pixel,
   wherein the shadow feature value of the vertex comprises information on whether the each vertex is located in the shadow area and information on a distance between the vertex and the boundary of the shadow area, and
   wherein the shadow information is stored by classifying, into clusters, a type of a change in a shadow feature value in image frames generated by rendering of the 3D model and storing an index of a cluster corresponding to a change in the shadow feature value of the vertex among the cluster.

12. The method of claim 11, wherein the extracting of the shadow feature value comprises:
   extracting, from the shadow information, a shadow feature value of the vertex for a reference virtual light source adjacent to a current virtual light source.

13. The method of claim 11, wherein the determining of the shadow area comprises:
   determining the shadow area based on a sign of the shadow feature value determined for the each pixel.

14. The method of claim 11, wherein the determining of the shadow area comprises:
   determining the shadow area by comparing the shadow feature value determined for the each pixel to a threshold value.

15. A three-dimensional (3D) rendering apparatus, comprising:
- a processor configured to extract a shadow feature value of a vertex of a 3D model from shadow information, to determine a shadow feature value for each pixel of a polygon by interpolating extracted shadow feature values of vertices forming the polygon, and to determine a shadow area based on the shadow feature value determined for the each pixel,
- wherein the shadow feature value of the vertex comprises information on whether the vertex is located in the shadow area and information on a distance between the vertex and the boundary of the shadow area, and
- wherein the shadow information is stored by classifying, into clusters, a type of change in a shadow feature value in image frames generated by rendering of the 3D model and storing an index of a cluster corresponding to a change in the shadow feature value of the vertex among the clusters.

16. The apparatus of claim 15, wherein the processor comprises at least one graphics processing unit (GPU), and the shadow information is stored in a texture buffer of the GPU.

\* \* \* \* \*